(12) United States Patent
Windsor et al.

(10) Patent No.: US 6,512,607 B1
(45) Date of Patent: Jan. 28, 2003

(54) HOLOGRAPHIC DISPLAY OVERLAY

(75) Inventors: Jeffry Clifton Windsor, Raleigh, NC (US); Robert James Stanley, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/722,785

(22) Filed: Nov. 27, 2000

(51) Int. Cl.[7] .................................................. G02B 5/32
(52) U.S. Cl. .................. 359/15; 313/112; 313/513; 345/619; 345/626; 348/40
(58) Field of Search ............................ 359/15; 313/513, 313/112; 348/40; 345/619, 626

(56) References Cited

U.S. PATENT DOCUMENTS 5,526,481 A * 6/1996 Parks et al. ................. 345/155
5,886,334 A   3/1999 D'Entremont et al.

FOREIGN PATENT DOCUMENTS

JP  09222954 A * 8/1997
WO  WO 96/21558 * 1/1995

OTHER PUBLICATIONS

Internet article called "Hologram Fundamentals", found at http://www.cfcintl.com/cfc_holographics/holobkgd.htm (6 pages).
Internet article called "Spatial Imaging's guide to dimensional imaging techniques", found at http://www.holograms.co.uk/guide.htm (27 pages).

* cited by examiner

Primary Examiner—Thong Nguyen
Assistant Examiner—Craig Curtis
(74) Attorney, Agent, or Firm—Coats & Bennett, P.L.L.C.

(57) ABSTRACT

A wireless communication device having a display screen with a holographic overlay. The holographic overlay includes an image that is visible when the display screen is viewed at predetermined angles. The holographic overlay may provide additional surface on the wireless communication device for marking and advertising, and may also provide security by preventing unintended viewers from seeing characters on the display screen. In one embodiment, the display screen includes a character screen, a lens, and a holographic overlay.

19 Claims, 5 Drawing Sheets

HOLOGRAPHIC DISPLAY OVERLAY

BACKGROUND OF THE INVENTION

The present invention is directed to a wireless communication device having a display and associated holographic overlay.

Wireless communication devices are becoming more popular in today's society. One reason for their increased popularity is their small size which allows a user to easily carry the device and use it in environments that were previously unavailable or inconvenient. The smaller device sizes introduce new challenges for the device manufacturers and service providers that were previously not encountered.

The size of the devices is now such that the name of the manufacturer or service provider is difficult to display or brand on the device. A common means of branding is to place the name on the face of the device in a conspicuous location such that it is seen by the user. However, with the decreasing device sizes, there is less usable space for placing the name. Therefore, new designs and locations are needed for clearly branding the phone without detracting from the functionality.

The smaller wireless communication devices are also now being used in crowded environments such as airports, restaurants, and the like. It is currently difficult to find an environment and location in which someone is not using a wireless communication device. Users often require privacy and security when using the devices in these crowded environments because confidential and sensitive information may appear on the display screen. The user may not want a person sitting beside them to peer over at the display screen and obtain this information. It would be advantageous for the display screen on the device to be seen by the user, yet prevent an unintended neighbor from viewing the display contents.

BRIEF SUMMARY OF THE INVENTION

The present invention includes a holographic overlay positioned proximate a display screen of a wireless communication device. The holographic overlay is positioned such that it has a first appearance when viewed at a first angle, and a second appearance when the display screen is viewed at a second angle. The holographic overlay may be substantially transparent at the first angle such that display characters appearing on the display screen are visible. When viewed at the second angle, the holographic overlay may substantially obscure the display characters.

The holographic overlay may provide previously unavailable surface area on the wireless communication device for advertising and other branding materials. The holographic overlay may also prevent an unintended viewer from seeing characters displayed on the display screen.

DETAILED DESCRIPTION OF THE INVENTION

The present invention is directed to a display screen 31 having a holographic overlay 33 for use in a wireless communication device 10. The holographic overlay 33 may prevent uninvited users from overseeing characters appearing on the display screen 31 and/or may also give additional area for advertising and other like branding features within a highly visible area of the wireless communication device 10.

Figure 1:
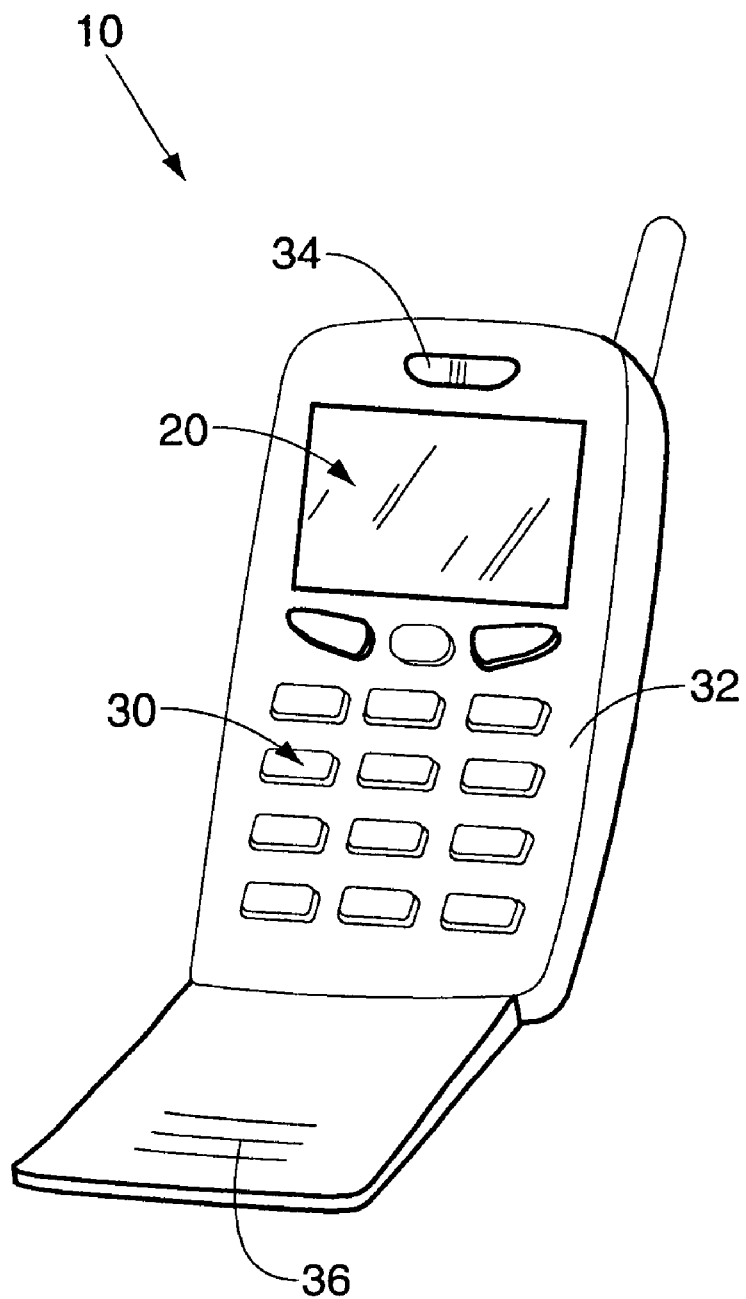
FIG. 1 is a perspective view of a wireless communication device in accordance with one embodiment of the present invention.

FIG. 1 illustrates one embodiment of a wireless communication device 10 applicable for use in the present invention. The wireless communication device 10 includes a display assembly 20 for displaying characters input and/or received by the user. The term "characters" is used herein to include alphanumeric characters as well as graphic images. Input keys 30 are positioned adjacent to the display assembly 20 for inputting and controlling the function of the device 10. Input keys 30 may include specific characters such as numbers and letters, or may represent control functions such as "enter", "on", "off" and the like for controlling the device 10. Control electronics, illustrated schematically as element 60 in FIG. 2, control the logic and processing of the device 10. Control electronics 60 are well known to those working with wireless communication devices and will not be discussed herein. An outer housing 32 extends around the display assembly 20 and input keys 30. In one embodiment, the outer housing 32 is constructed of a rigid material to protect the control electronics 60. The embodiment illustrated in FIG. 1 is a portable cellular telephone that further includes a speaker 34 and microphone 36 for the user to partake in voice communications.

Figure 2:
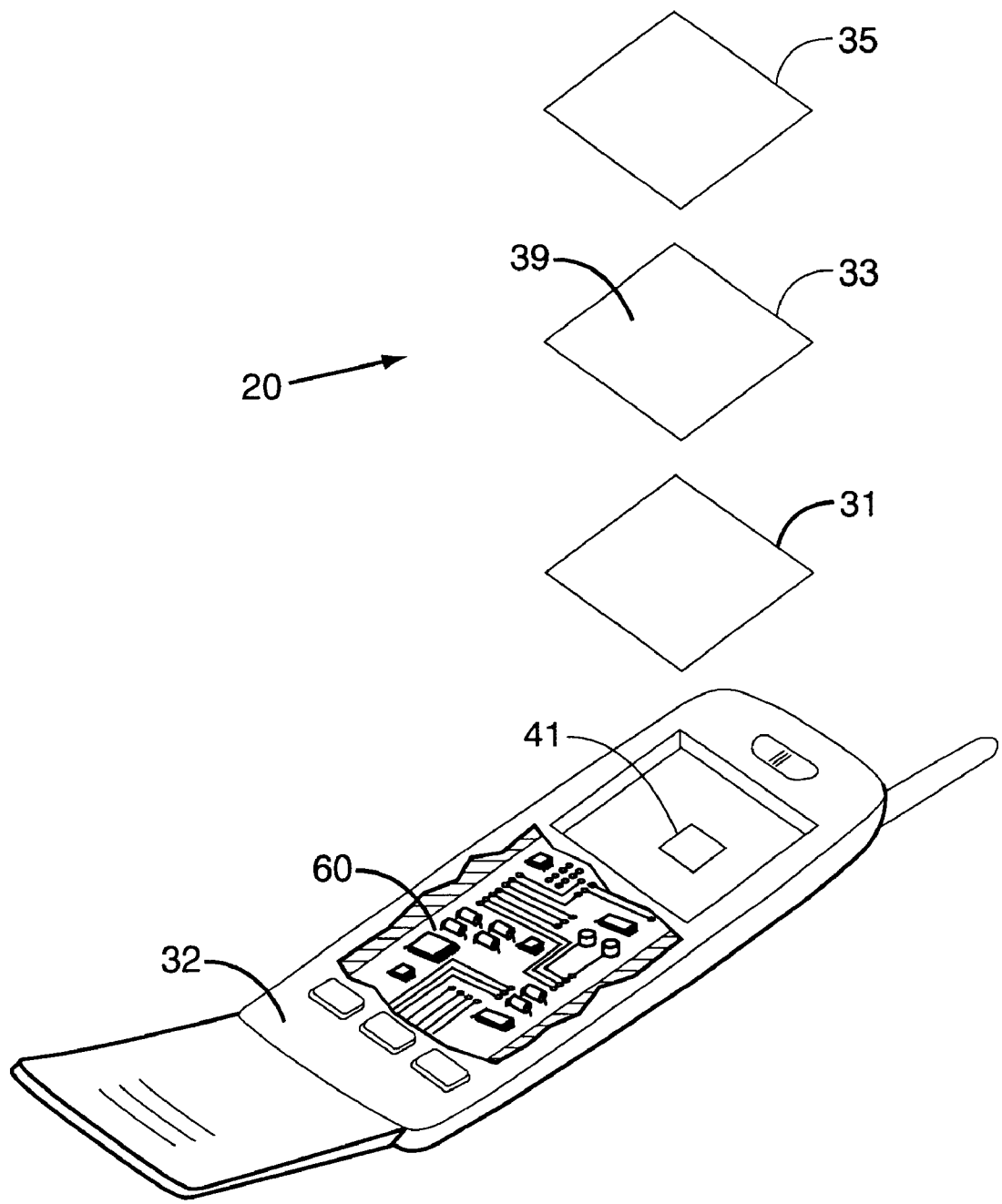
FIG. 2 is an exploded perspective view illustrating the elements of the display screen in accordance with one embodiment of the present invention.

FIG. 2 illustrates one embodiment of the display assembly 20 that includes a display screen 31, the holographic overlay 33, and a lens 35. Other embodiments of the display assembly 20 are also contemplated by the present invention including the display screen 31 and the holographic overlay 33 without a lens 35. Another embodiment includes the lens 35 incorporated into the display screen 31 such that it is a unitary element. Also, the holographic image 39 may be manufactured into the display screen 31 or the lens 35. The orientation of the display screen 31 may also be varied depending upon the specific embodiment. As illustrated in FIG. 2, display assembly 20 includes the holographic overlay 33 positioned between the display screen 31 and the lens 35. In another embodiment, lens 35 may be positioned between the display screen 31 and the holographic overlay 33.

Display assembly 20 is positioned in an opening within the outer housing 32. The display screen 31 is operatively connected to the control electronics 60 for displaying characters to the user. A variety of display screen embodiments are contemplated by the present invention, two of which include a liquid crystal display and a CRT monitor. Lens 35 is constructed of a transparent material such that the user may be able to see the display screen 31. Lens 35 may also magnify or manipulate the characters on the display screen 31 for easier viewing by the user. Additionally, lens 35 protects the display screen 31 and holographic overlay 33 from being damaged when placed on the outer surface of the display assembly 20.

A holographic image 39 is positioned within the display assembly 20. The image 39 is constructed such that it is visible to a viewer when the display assembly 20 is viewed from a specific angle or range of angles. The image 39 may either have the appearance of a two-dimensional or three-dimensional object. In one embodiment, image 39 displays the name, insignia, or other identifying indicia of the manufacturer or service provider thus branding the device 10.

Figure 3:
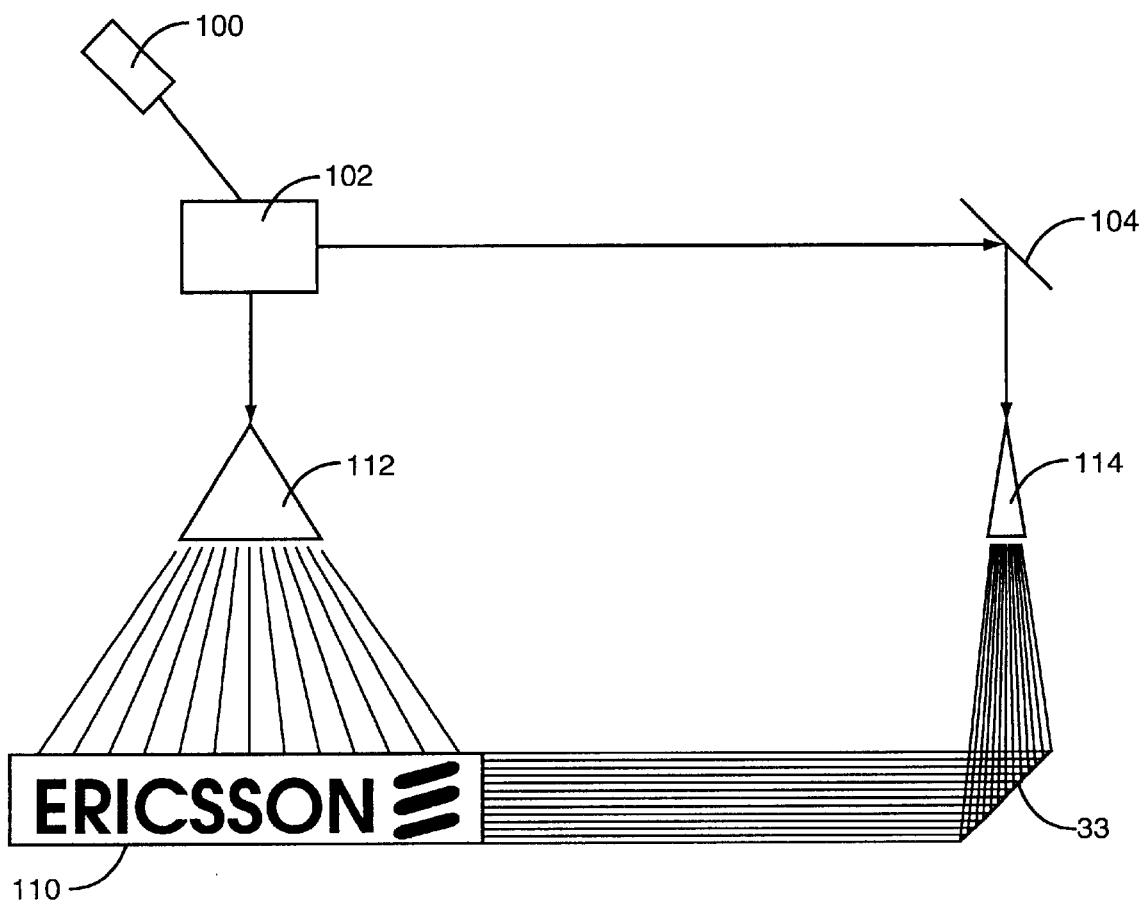
FIG. 3 is a schematic view illustrating the production of a hologram for producing a holographic overlay in accordance with the present invention.

FIG. 3 illustrates a simplistic schematic view of forming the branding image 39 on the holographic overlay 33. A coherent light source 100, such as a laser, is directed onto a beam splitter 102 that splits the original beam into two separate beams. A first beam is directed to lens 112 that diffuses the light onto the object being recorded. This light reflects off the object onto the film plate of the holographic overlay 33. The second beam is reflected from a mirror 104 through a diffusing lens 114 and onto the film plate of the holographic overlay 33. The first beam and second beam are from the same light source 100 and have perfect intersection points when reaching the holographic display 33 thus creating a clear image of the object 110.

In one embodiment, the holographic overlay 33 comprises a series of grooves formed on the surface of the recording medium that bend light rays in a manner similar to a prism. The grooves may be sized such that there are hundreds to thousands of grooves per millimeter. Another embodiment features the holographic overlay 33 constructed of variations throughout the depth of the overlay. The variations may include light and dark or refractive index differences that produce the visible representation of the object 110. Hybrid combinations of the embodiments may also be used, such as a layered grating display in which two or more overlays each having surface grating are combined together forming a display having variations throughout the depth. Layered overlays 33 may also be used for displaying multi-images that are each visible when viewed at a predetermined angle or range of angles.

The holographic image 39 may be constructed in a manner of different embodiments. In one embodiment, the image 39 is produced by embossing. A series of grooves are pressed into one of the elements of the display assembly 20 to create the image. Embossed holograms may further be coated with aluminum to enhance the appearance and brightness of the image. The holographic image 39 may be positioned on the overlay 33, in the display screen 31 or the lens 35. In the embodiments in which the image 39 is on the lens 35 or screen 31, the display assembly 20 may not include a separate overlay layer 33.

The image 39 may be visible within the holographic overlay 33 from either light transmitted from the device 10 through the display assembly 20 or light from an external source reflected from the overlay 33. As schematically illustrated in FIG. 2, device 10 may include a light source 41 for illuminating the display assembly 20 such as during low ambient light conditions. Light emanating from the light source 41 passes through the display assembly 20 causing the image 39 to be visible. In another embodiment, display screen 31 may be a light emitting panel that is illuminated when in use. Alternatively, external light may be directed onto the display assembly 20 and reflect off the holographic overlay 33 to display the image 39.

Figure 4:
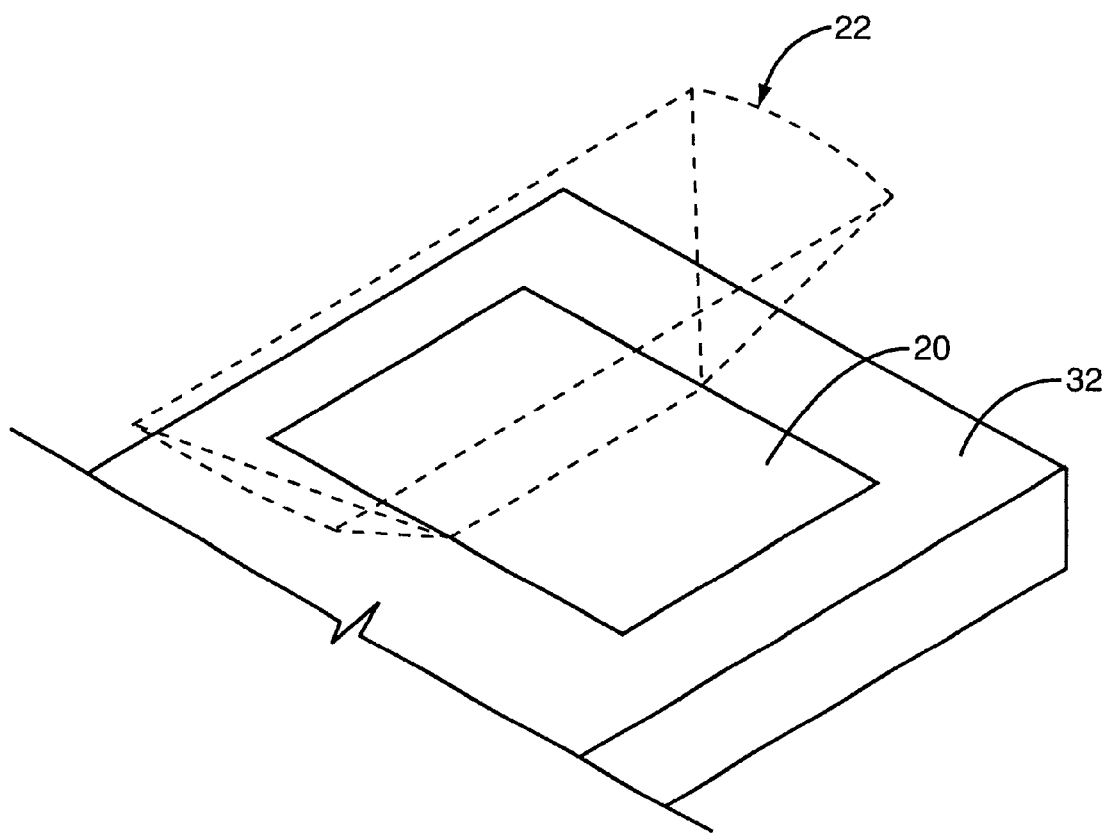
FIG. 4 is a schematic diagram illustrating a viewing region for observing characters on the display screen.

The holographic display 33 is designed such that the image 39 is not visible when the display assembly 20 is viewed from certain angle or range of angles. This results in display screen 31 having different appearances when viewed from different angles. One embodiment is illustrated in FIG. 4 in which a viewing region 22 defines the area in which the image 39 is not visible and the characters entered on the display screen 31 can be viewed by the user. In the embodiment illustrated, the viewing region 22 is aligned such that the user can longitudinally angle the display assembly 20 without obscuring the characters. However, observing the display assembly 20 laterally from the sides results in the characters being obscured by the image 39. This configuration allows the user to work with substantial privacy in an environment where persons are positioned laterally on one or both sides. The viewing region 22 may be adjusted to accommodate a variety of angles and range of angles. In one embodiment, the viewing region 22 encompasses about sixty degrees aligned about an axis drawn normal through the center of the display assembly 20. Additionally, the viewing region 22 may be aligned laterally or longitudinally about the display assembly 20. In another embodiment, the viewing region 22 has a substantially cone-shape in which a point of the cone is positioned about the center of the display assembly 20.

Figure 5A:
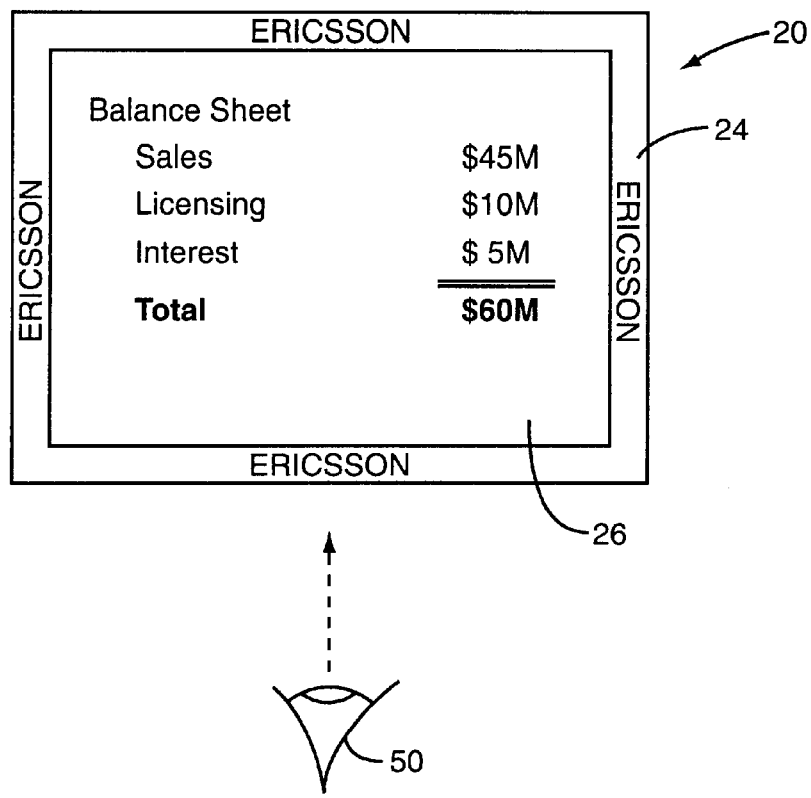
FIG. 5A is a display screen as seen when viewed within the viewing region.
Figure 5B:
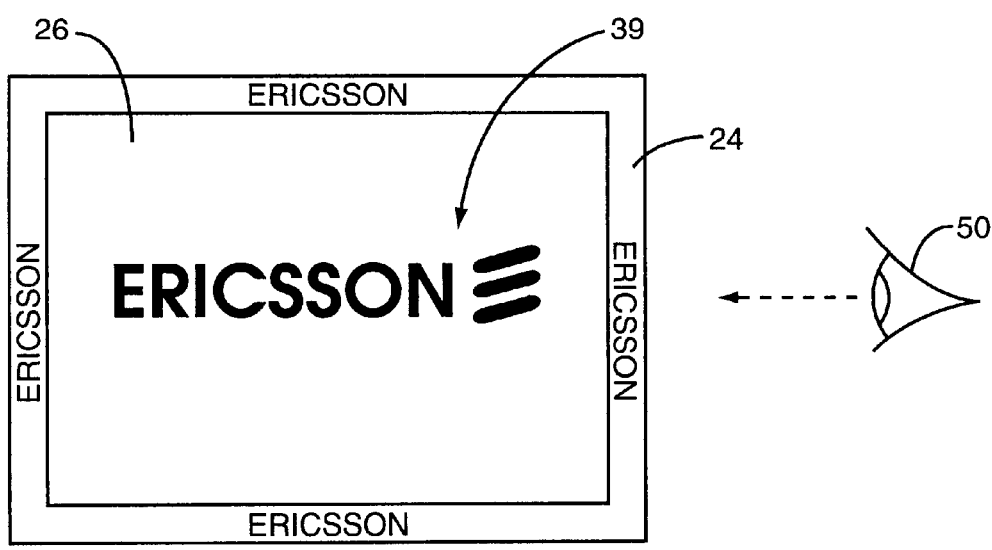
FIG. 5B illustrates the appearance of the display screen of FIG. 5A as seen from an angle outside of the viewing region.

The viewing region 22 may be aligned such that the image 39 completely obscures the characters on the display assembly 20 when viewed from outside of the viewing region 22 and the image 39 is not visible when viewed from within the region 22. This embodiment is illustrated in FIGS. 5A and 5B. When viewer 50 is aligned with the display assembly 20 to be within the viewing region 22, the characters are visible and the branding image 39 is not visible as in FIG. 5A. When the viewing angle changes such that the viewer 50 is outside of the viewing region 22 as in FIG. 5B, the characters are completely obscured by the branding image 39.

In another embodiment, the branding image 39 may become increasingly visible as the viewing angle moves away from the center of the viewing region 22. Both the characters on the display assembly 20 and the image 39 may be visible at the same angle within the viewing region 22. As the angle moves from the center of the viewing region, the image 39 becomes more visible and begins to obscure the characters. Eventually, the angle becomes such that the image 39 completely blocks the characters. In one embodiment, the contrast ratio between the characters and the background of the display screen 20 falls from more than 100:1 when viewed perpendicular to the display screen 20 to less than 10:1 when viewed at ±30° in the lateral direction because the image 39 becomes more prominent.

More than one image 39 may also be visible on the display assembly 20. In one embodiment, a first image 39 is visible from a first range of viewing angles, and a second image 39 is visible within another range of viewing angles. In another embodiment, both images 39 may be visible at the same angle, or range of angles. Another embodiment features an image 39 displayed across the entire display assembly 20 when light 41 is not activated. When activated, light 41 causes the image 39 to be obscured such that the user can clearly see the characters on the display screen 31. A variety of embodiments having multiple images 39 are available and considered by the present invention.

The display screen 31 may be divided into separate sections having different displays or different images 39. As illustrated in FIGS. 5A and 5B, the display screen 31 is divided into an active region 26 and an inactive region 24. Active region 26 includes the space where characters are displayed and viewed by the user. In the embodiment illustrated, the active region 26 includes a first image 39. Inactive region 24 is the peripheral edge of the display screen 20 that is not used for displaying characters and borders the active region. Inactive region 24 may include a separate image 39, or may include a permanent image that is not dependent on the viewing angle.

As illustrated in FIG. 2, one embodiment features the holographic display 33 positioned between the display screen 31 and the lens 35. Other placements of the elements are also contemplated by the present invention. One embodiment features the holographic overlay 33 positioned on the outer side of the lens 35. The display assembly 20 may be positioned within the outer housing 32 such that it is easily removable to customize the appearance of the device 10. Users may desire to use different holographic displays 33 at different times or during different environments. By way of example, the user's favorite basketball team may be displayed on the branding image 39 during basketball season, and replaced by the favorite football team as necessary. Additionally, straight-forward replacement and change-out of the holographic display 33 allows the manufacturer to more readily tailor the appearance of the device 10 to meet the demands of the user.

The term "wireless communication device" denoted by element number 10 used herein refers to a variety of different devices. Devices may include: a cellular radiotelephone; a Personal Communications System (PCS) terminal that may combine a cellular radiotelephone with data processing, facsimile and data communications capabilities; a Personal Digital Assistant (PDA) that can include a radiotelephone, pager, Internet/intranet access, Web browser, organizer, calendar and/or a global positioning system (GPS) receiver. The term wireless communication device 10 also encompasses computing devices, such as a personal computer, laptop computer, or palmtop computer, that includes a communications interface for communicating with other devices.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A wireless communication device comprising:
   a display screen operatively connected to control electronics for displaying characters to a user;
   a holographic overlay positioned over at least a portion of said display screen;
   said holographic overlay causing said display screen to have a first appearance when said display screen is viewed at a first angle, and a second appearance when said display screen is viewed at a second angle; and
   wherein said holographic overlay comprises an image that is substantially transparent at said first angle and substantially opaque at said second angle.

2. The device of claim 1, wherein said image becomes less transparent as a viewing angle increases.

3. A display assembly for use on a wireless communications device, said display assembly comprising:
   a display screen operatively connected to control electronics for control thereof to display characters; and
   a holographic overlay having an image and being positioned proximate to said display screen, said holographic overlay forming a viewing region to observe said characters, said characters being visible when viewed from within said viewing region and said characters being obscured by said image when said display screen is viewed from outside of said viewing region.

4. The display assembly of claim 3, wherein both said image and said display characters are visible within at least a portion of said viewing region.

5. The display assembly of claim 3, wherein said image blocks said display characters when viewed from outside of said viewing region.

6. The display assembly of claim 3, further including a lens positioned on an exterior side of said display screen, said holographic overlay is positioned between said display screen and said lens.

7. The display assembly of claim 3, further including a lens positioned on an exterior side of said display screen, said lens is positioned between said display screen and said holographic overlay.

8. The display assembly of claim 3, further including a permanent indicia positioned over at least a portion of said display screen.

9. The display assembly of claim 3, wherein said viewing region is substantially wedge-shaped.

10. The display assembly of claim 3, wherein said viewing region is substantially cone-shaped.

11. The display assembly of claim 4, wherein a contrast between said display characters and said image decreases as a viewing angle increases.

12. A method of controlling information displayed on a wireless communication device, the method comprising the steps of:
   providing a holographic overlay positioned over a display screen of the wireless communication device, the display screen being operatively connected to control electronics for control thereof;
   allowing characters on the display screen to be visible through the holographic overlay when viewed from a first angle relative to the display screen; and
   causing an image associated with the holographic overlay to obscure the characters on the display screen when the display screen is viewed from a second angle.

13. The method of claim 12, wherein the step of allowing characters on the display screen to be visible through the holographic overlay comprises allowing the characters on the display screen to be visible when viewed within a range of angles.

14. The method of claim 12, wherein the step of causing said image associated with the holographic overlay to obscure the characters on the display screen when the display screen is viewed from said second angle comprises causing both the characters on the display screen and the image to be visible concurrently when the display screen is viewed from said second angle.

15. The method of claim 14, wherein the step of causing said image associated with the holographic overlay to obscure the characters on the display screen when the display screen is viewed from said second angle comprises blocking the characters on the display screen with the image.

16. A method of displaying characters on a wireless communication device, the method comprising the steps of:
   displaying characters on a display screen operatively connected to control electronics for control thereof;
   positioning a holographic overlay over the characters, said holographic overlay having an image;
   providing the characters to be visible when viewing the wireless communication device from a range of angles; and providing the image to be visible when viewing the wireless communication device from outside of said range of angles.

17. The method of claim 16, wherein the image is transparent when viewing the wireless communication device from said range of angles.

18. The method of claim 16, wherein the step of providing the image to be visible when viewing the wireless communication device from outside of said range of angles comprises blocking the characters from being visible.

19. The method of claim 17, wherein both the image and the characters are visible when the wireless communication device is viewed from at least a portion of said range of angles.

\* \* \* \* \*